United States Patent
Watanabe et al.

[11] Patent Number: 6,038,007
[45] Date of Patent: Mar. 14, 2000

[54] IN-PLANE TYPE LIQUID CRYSTAL DISPLAY APPARATUS WITH INCREASED NUMERICAL APERTURE

[75] Inventors: Makoto Watanabe; Takahiko Watanabe, both of Tokyo, Japan

[73] Assignee: NEC Corporation, Tokyo, Japan

[21] Appl. No.: 08/921,012

[22] Filed: Aug. 29, 1997

[30] Foreign Application Priority Data

Aug. 30, 1996 [JP] Japan .................................. 8-230596

[51] Int. Cl.⁷ .................................................. G02F 1/1333
[52] U.S. Cl. .......................... 349/110; 349/111; 349/141
[58] Field of Search .................................. 349/110, 111, 349/139, 141, 143, 144

[56] References Cited

U.S. PATENT DOCUMENTS 5,781,261  7/1998  Ohta et al. ............................... 349/110

FOREIGN PATENT DOCUMENTS

| | | |
|---|---|---|
| 0 699 939 A1 | 6/1994 | European Pat. Off. . |
| 0 644 452 A2 | 9/1994 | European Pat. Off. . |
| 0 644 452 A3 | 9/1994 | European Pat. Off. . |
| 7-159786 | 6/1995 | Japan . |
| 7-239480 | 9/1995 | Japan . |
| 8-136931 | 5/1996 | Japan . |
| 8-201773 | 8/1996 | Japan . |
| 8-201847 | 8/1996 | Japan . |
| 8-271919 | 10/1996 | Japan . |
| 9-156050 | 1/1997 | Japan . |

*Primary Examiner*—William L. Sikes
*Assistant Examiner*—James A. Dudek
*Attorney, Agent, or Firm*—Sughrue, Mion, Zinn, Macpeak & Seas, PLLC

[57] ABSTRACT

In an in-plane liquid crystal display apparatus including a first transparent substrate having a plurality of gate bus lines, a plurality of drain bus lines, a plurality of pixel electrodes each connected via a switching element to one of the drain bus lines, and a common electrode on the first transparent substrate; a second transparent substrate; and a liquid crystal layer interposed between the first and second transparent substrate, an optical shield layer, is formed on the first transparent substrate and covers the drain bus lines.

7 Claims, 8 Drawing Sheets

IN-PLANE TYPE LIQUID CRYSTAL DISPLAY APPARATUS WITH INCREASED NUMERICAL APERTURE

BACKGROUND OF THE INVENTION

1. Field of the Invention

The present invention relates to an in-plane liquid crystal display (LCD) apparatus.

2. Description of the Related Art

In an in-plane LCD apparatus, liquid crystal is driven by an electric field generated horizontally with respect to substrates (see U.S. Pat. No. 3,807,831 & JP-A-56-91277).

In a prior art in-plane liquid crystal display apparatus including a glass substrate, a counter glass substrate, and a liquid crystal layer sandwiched thereby, a plurality of gate bus lines, a plurality of drain bus lines, a plurality of pixel electrodes each connected via a switching element to one of the drain bus lines, and a common electrode are formed on one of the glass substrates. Also, an optical shield layer is formed on the counter glass substrate and covers the drain bus lines. This will be explained later in detail.

In the prior art in-plane type LCD apparatus, however, since the optical shield layer is provided on the counter glass substrate, not on the glass substrate, the optical shield layer needs to be large in view of the alignment accuracy between the glass substrate and the counter glass substrate. This substantially reduces the numerical aperture of the apparatus.

In addition, spurious weak lateral electric fields caused by the pixel electrodes and the drain bus lines are generated within the liquid crystal layer, which modulates a lateral electric field as a signal. As a result crosstalk it generated, thus remarkably reducing the display quality.

SUMMARY OF THE INVENTION

It is an object of the present invention to provide an in-plane type LCD apparatus capable of increasing the numerical aperture.

Another object is to provide an in-plane type LCD apparatus capable of enhancing the display quality.

According to the present invention, in an in-plane liquid crystal display apparatus including a first transparent substrate having a plurality of gate bus lines, a plurality of drain bus lines, a plurality of pixel electrodes each connected via a switching element to one of the drain bus lines, and a common electrode on the first transparent substrate; a second transparent substrate; and a liquid crystal layer interposed between the first and second transparent substrate, an optical shield layer is formed on the first transparent substrate and covers the drain bus lines.

Thus, the optical shield layer is formed regardless of the alignment accuracy between the two transparent substrates.

Also, a definite DC voltage is applied to the optical shield layer to enhance the display quality.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of the preferred embodiments, a prior art in-plane type LCD apparatus will be explained with reference to FIGS. 1, 2, 3 and 4.

Figure 1:
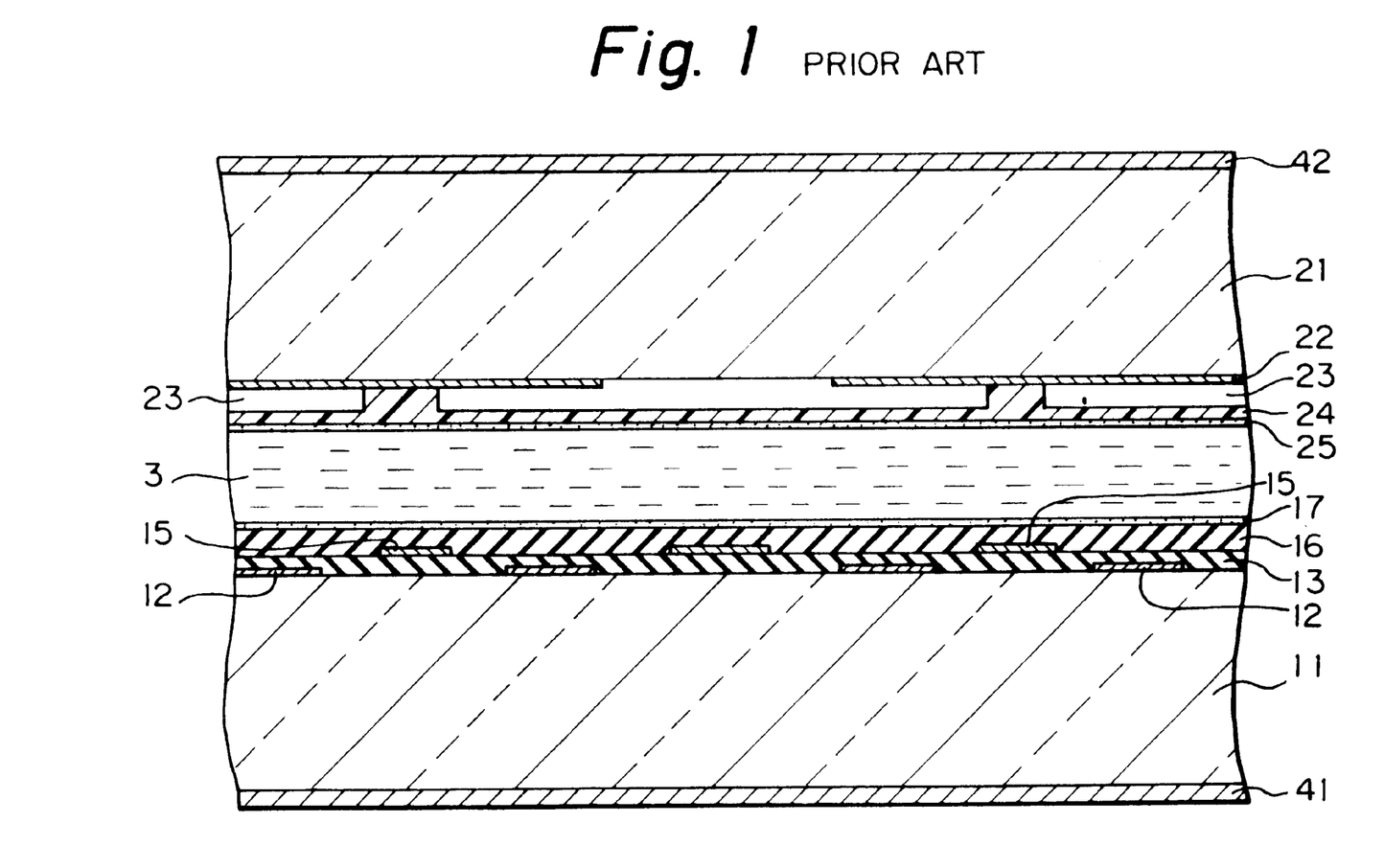
FIG. 1 is a cross-sectional view illustrating a prior art in-plane type LCD apparatus.
Figure 2:
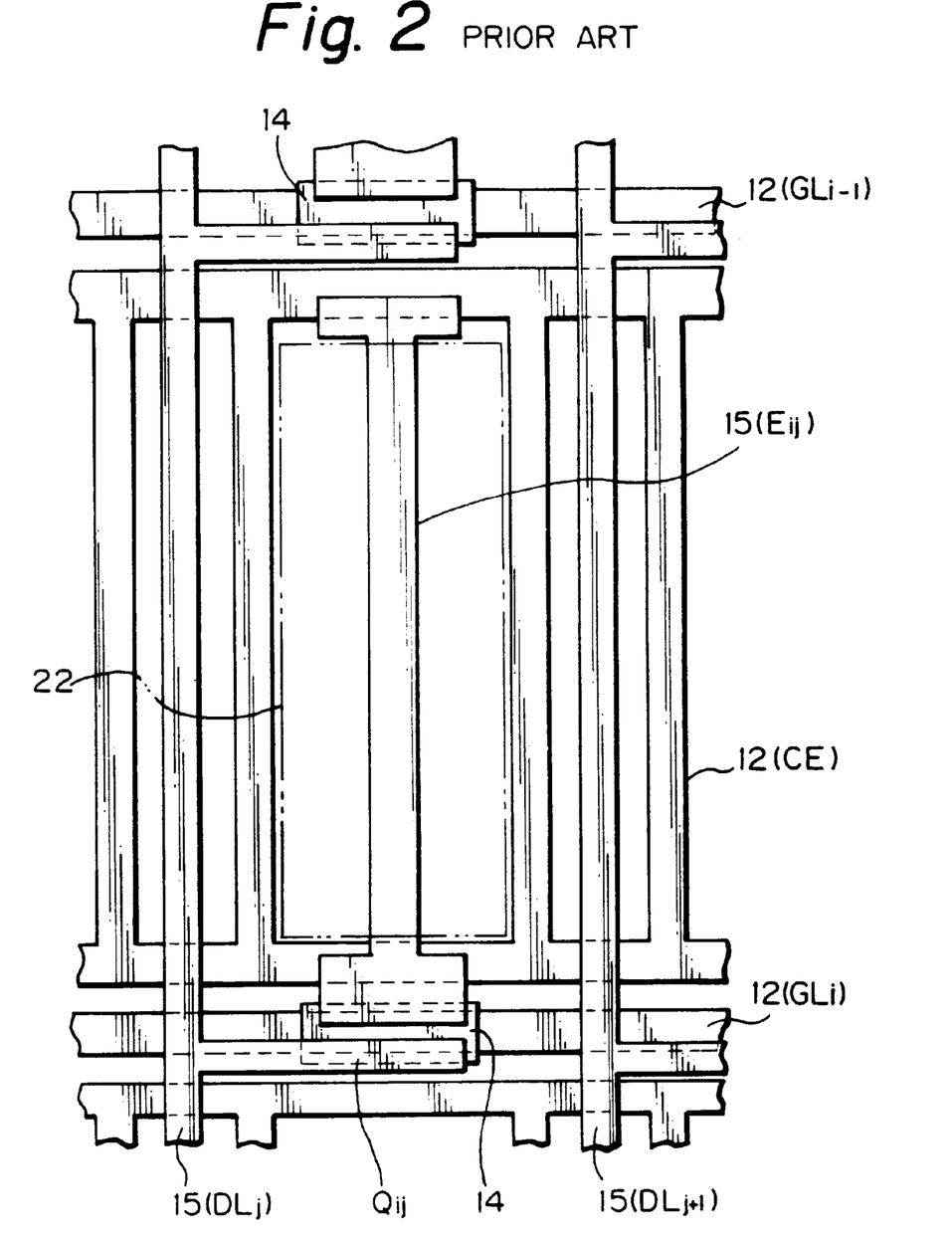
FIG. 2 is a plan view of the apparatus of FIG. 1.

FIG. 1 is a cross-sectional view illustrating a prior art in-plane type LCD apparatus, and FIG. 2 is a plan view of the apparatus of FIG. 1. As illustrated in FIGS. 1 and 2, reference numeral 11 designates a glass substrate on which a conductive layer 12 made of Cr or the like is formed. The conductive layer 12 is patterned to form a ladder type common electrode CE and scan bus lines (gate bus lines) such as $GL_i$. Also, an insulating layer 13 made of silicon-nitride is formed on the conductive layer 12. In this case, the insulating layer 13 serves as a gate insulating layer of a thin film transistor (TET) $Q_{ij}$. Further, an amorphous silicon pattern 14 (shown only in FIG. 2) is formed only on the gate bus lines $GL_{i-1}$, $GL_i$, . . . . In addition, a conductive layer 15 is formed on the insulating layer 13 and the amorphous silicon pattern 14 and is patterned to form signal bus lines (drain bus lines) such as $DL_j$ and pixel electrodes such as $E_{ij}$. Thus, the TET such as $Q_{ij}$ is formed by a gate electrode connected to the gate bus line $GL_i$, a drain electrode connected to the drain bus line $DL_j$, and a source electrode connected to the pixel electrode $E_{ij}$. Further, the pixel electrodes such as $E_{ij}$ and the drain bus lines such as $DL_j$ are covered by a passivation layer 16, and also, an orientation layer 17 is coated on the passivation layer 16, so that a rubbing operation is performed upon the orientation layer 17.

On the other hand, a counter glass substrate 21 is prepared, and an optical shield layer 22 made of $C_r$ or Al is formed on the counter glass substrate 21. Also, red, green and blue color filters 23 are formed on the counter glass substrate 21 and the optical shield layer 22. Further, a passivation resin layer 24 is formed on the color filters 23 and the optical shield layer 22, and also, an orientation layer 25 is coated on the passivation resin layer 24, so that a rubbing operation is performed upon the passivation resin layer 25. Note that the direction of the rubbing operation of the orientation layer 25 is the same as that of the orientation layer 17.

The above-assembled glass substrates 11 and 21 are adhered to each other with a predetermined spacing therebetween, and then, a liquid crystal layer 3 is inserted into this spacing.

After that, a polarization plate 41 is adhered to a surface of the glass substrate 11 on the opposite side of the liquid crystal layer 3. In this case, the polarization direction of the polarization plate 41 coincides with the rubbing direction of the orientation layers 17 and 25. On the other hand, a polarization plate 42 is adhered to a surface of the counter glass substrate 21 on the opposite side of the liquid crystal layer 3. In this case, the polarization direction of the polarization plate 42 is perpendicular to the rubbing direction of the orientation layers 17 and 25.

Thus, an in-plane type LCD apparatus is completed.

In the in-plane type LCD apparatus of FIGS. 1 and 2, when a voltage is applied to the gate bus line $GL_i$, the TFT $Q_{ij}$ is turned ON, so that charges are injected from the drain bus line $DL_j$ via the TFT $Q_{ij}$ to the pixel electrode $E_{ij}$. After the TFT $Q_{ij}$ is turned OFF, the potential at the pixel electrode $E_{ij}$ remains at the same level. On the other hand, a definite DC voltage is applied to the common electrode CE. Therefore, as indicated by X in FIG. 3, a lateral electric field is generated within the liquid crystal layer 3 by a difference in potential between the pixel electrode $E_{ij}$ and the common electrode CE, so as to change retardation of liquid crystal in the liquid crystal layer 3. Thus, the change of the retardation liquid crystal as well as the optical property of the orientation plates 17 and 25 controls the transmission of light through the liquid crystal layer 3. In this case, the optical shield layer 22 covers a region of the liquid crystal layer 3 where the above-mentioned lateral electric field cannot be generated, thus preventing leakage of light through this region. In this case, the optical shield layer 22 covers the gate bus lines such as GLi and the drain bus lines such as $DL_j$.

In the in-plane type LCD apparatus of FIGS. 1 and 2, however, since the optical shield layer 22 is provided on the counter glass substrate 21, not on the glass substrate 11, the optical shield layer 22 needs to be larger in view of the alignment accuracy between the glass substrate 11 and the counter glass substrate 21. Note that this alignment accuracy is usually ±10 μm. This substantially reduces the numerial aperture of the apparatus.

Figure 3:
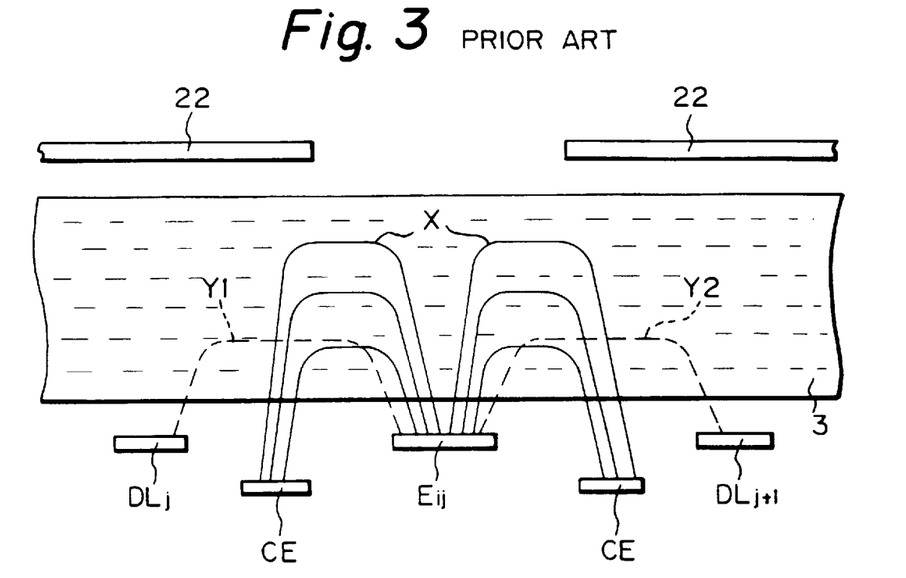
FIG. 3 is a cross-sectional view illustrating an enlargement of the liquid crystal layer of FIG. 1 for explaining the generation of lateral electric fields.
Figure 4:
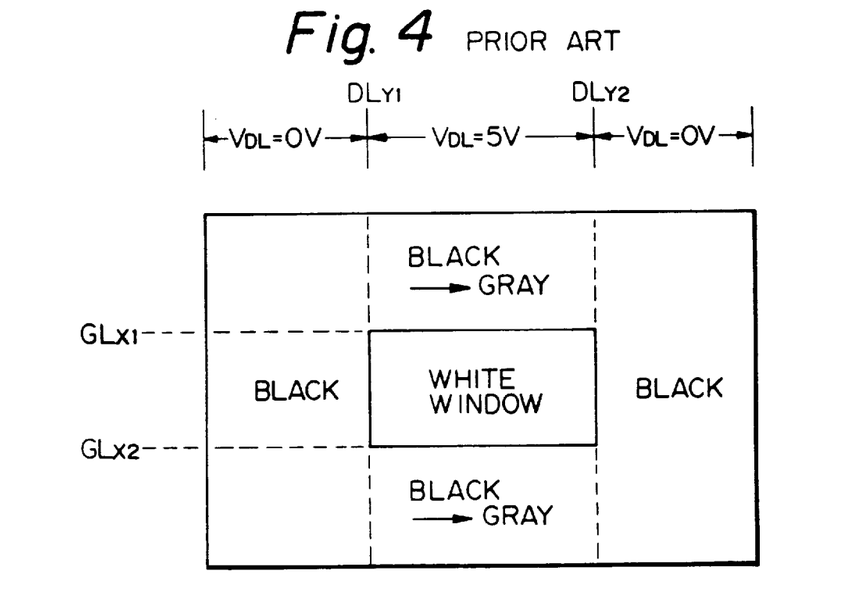
FIG. 4 is a diagram illustrating panel of the in-plane type LCD apparatus of FIG. 1 for explaining the generation of crosstalk.

In addition, as indicated by Y1 and Y2 in FIG. 3, spurious weak lateral electric fields caused by the pixel electrode $E_{ij}$ and the drain bus lines $DL_j$ and $DL_{j+1}$ are generated within the liquid crystal layer 3, which modulates the lateral electric field as indicated by X in FIG. 3. As a result, as shown in FIG. 4, if a white window is displayed by making only the drain bus lines $DL_{y1}$ to $DL_{y2}$ high(=5V) while the gate bus lines $GL_{x1}$ to $GL^{x2}$ are scanned, crosstalk along a vertical direction is generated at the upper and lower sides of the white window since the above-mentioned modulation depends upon the potential at the drain bus lines. This remarkably reduces the display quality.

Figure 5:
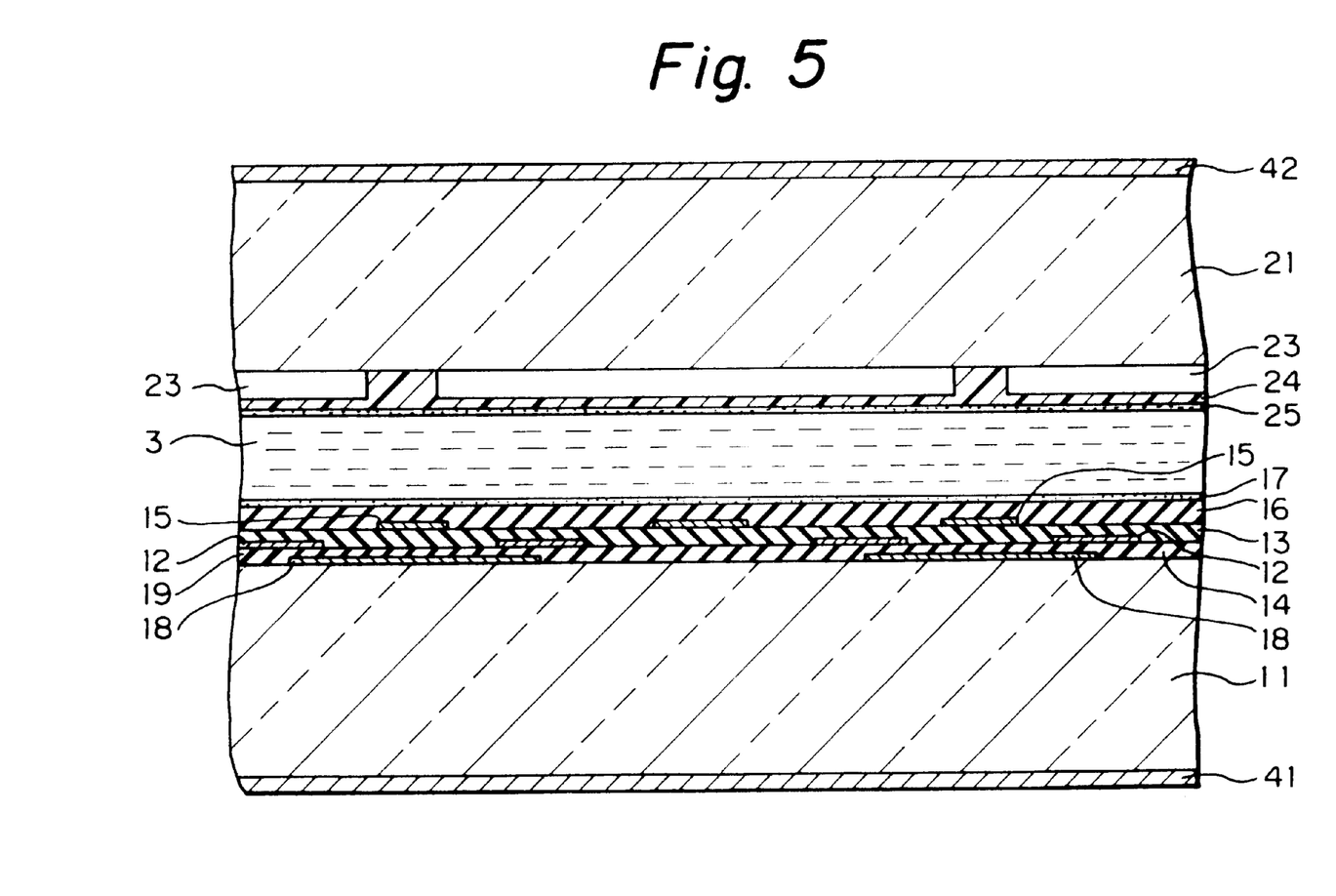
FIG. 5 is a cross-sectional view illustrating a first embodiment of the in-plane type LCD apparatus according to the present invention.
Figure 6:
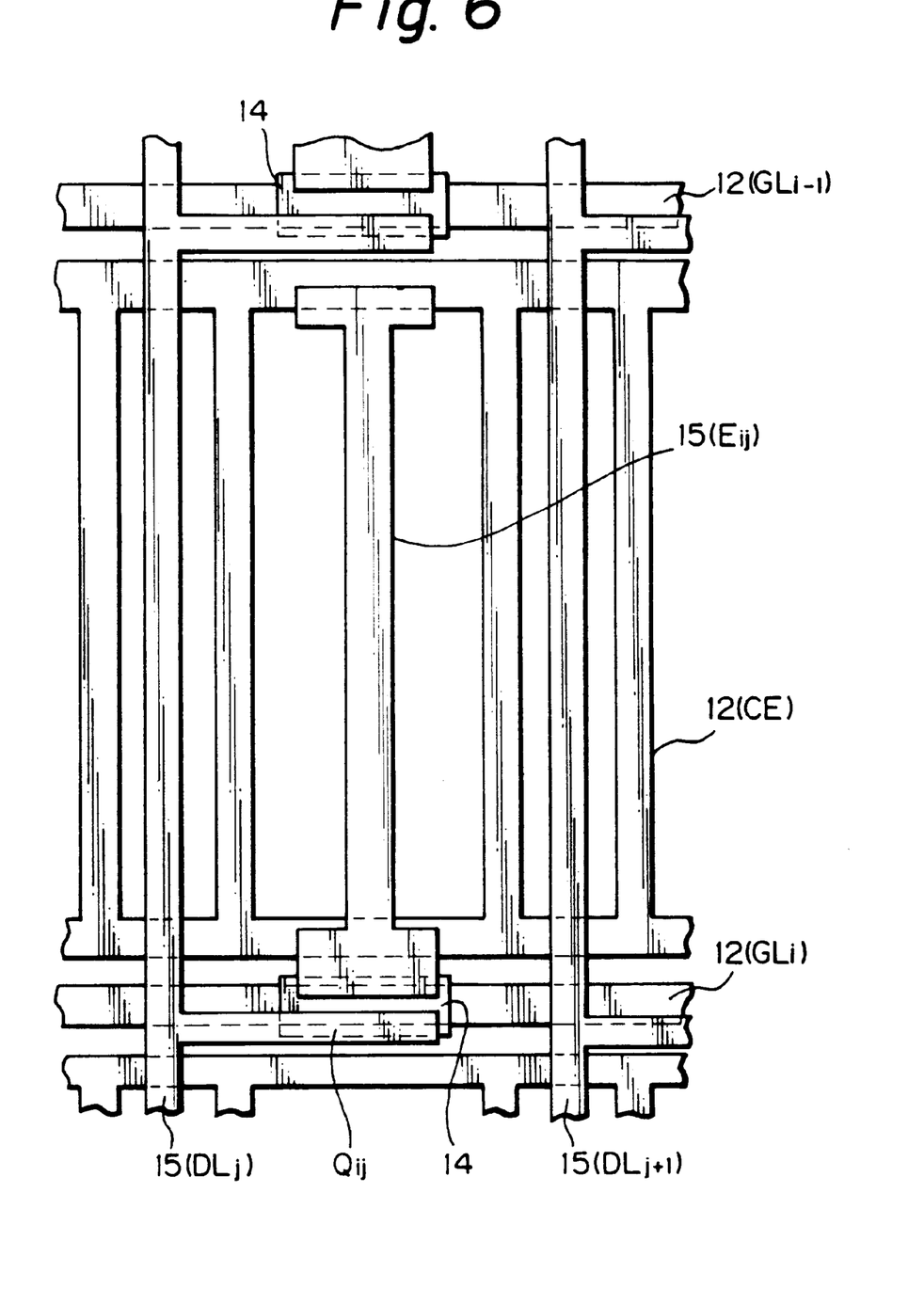
FIG. 6 is a plan view of the apparatus of FIG. 5.

FIG. 5 is a cross-sectional view illustrating a first embodiment of the present invention, and FIG. 6 is a plan view of FIG. 5. In FIGS. 5 and 6, an optical shield layer 18 made of Cr or Al and an insulating layer 19 made of silicon nitride are formed on the glass substrate 11 instead of the optical shield layer 22 of FIGS. 1 and 2. Even in this case, the optical shield layer 18 covers a region of the liquid crystal layer 3 where lateral electric fields as indicted by X in FIG. 7 cannot be generated, thus, preventing leakage of light through this region. That is the optical shield layer 18 covers, the drain bus lines $DL_j$, the gate bus lines $GL_i$ and portions between the drain bus lines and the common electrode CE.

In the in-plane type LCD apparatus of FIGS. 5 and 6, since the optical shield layer 18 is provided on the glass substrate 11, not on the counter glass substrate 21, the optical shield layer 18 can be small, since it is unnecessary to consider the large alignment accuracy between the glass substrate 11 and the counter glass substrate 21. This substantially increases the numerical aperture of the appartus.

Figure 7:
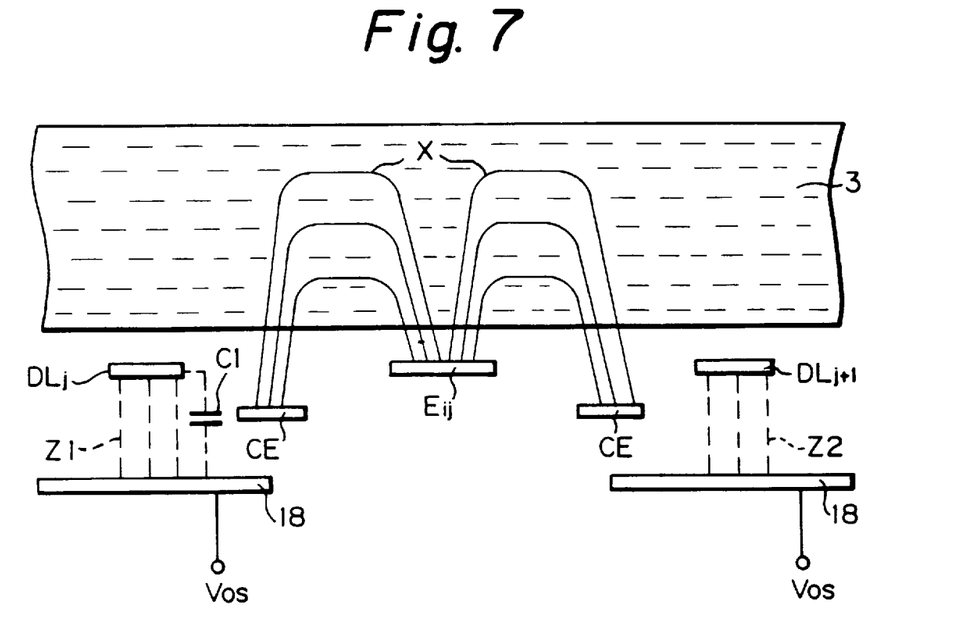
FIG. 7 is a cross-sectional view illustrating an enlargement of the liquid crystal layer of FIG. 5 for explaining the generation of lateral electric fields.
Figure 8:
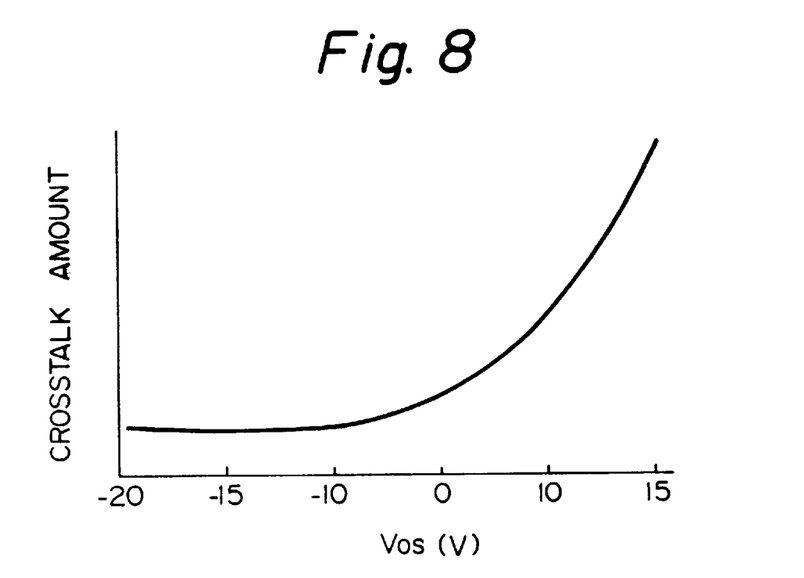
FIG. 8 is a graph showing the crosstalk characteristics of the apparatus of FIG. 5.

In addition, as illustrated in FIG. 7, a DC voltage $V_{os}$ is applied to the optical shield layer 18 to create electric fields as indicated by Z1 and Z2 in FIG. 7. The electric fields Z1 and Z2 are operated to lessen the electric fields Y1 and Y2 in FIG. 3, thus suppressing the crosstalk along a vertical direction. For example, as shown in FIG. 8, when the DC voltage $V_{os}$ is negative, particularly, smaller than −10V, the modulation effect can be reduced, so that the amount of crosstalk is remarkably reduced, thus enhancing the display quality.

Figure 9:
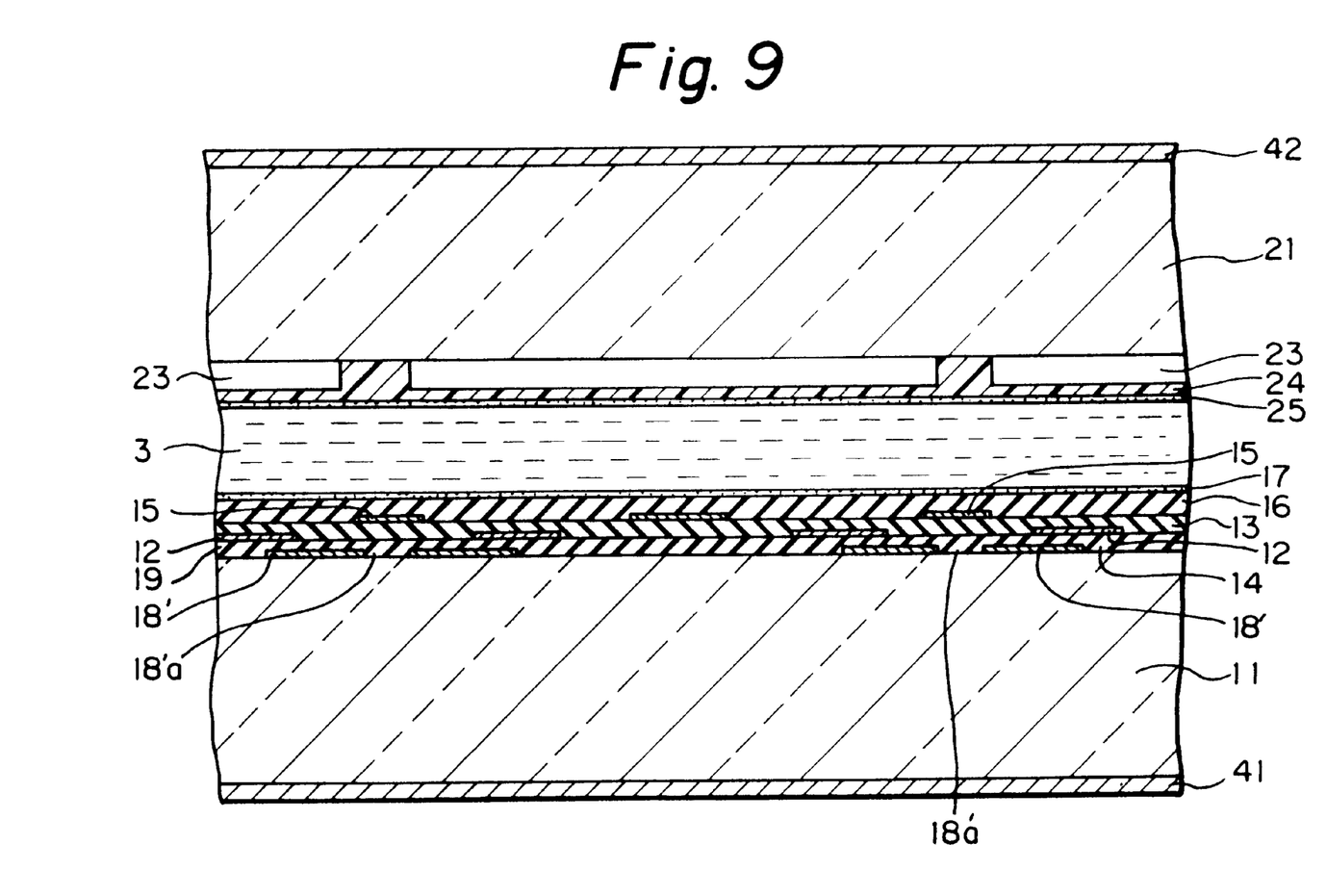
FIG. 9 is a cross-sectional view illustrating a second embodiment of the in-plane type LCD apparatus according to the present invention.
Figure 10:
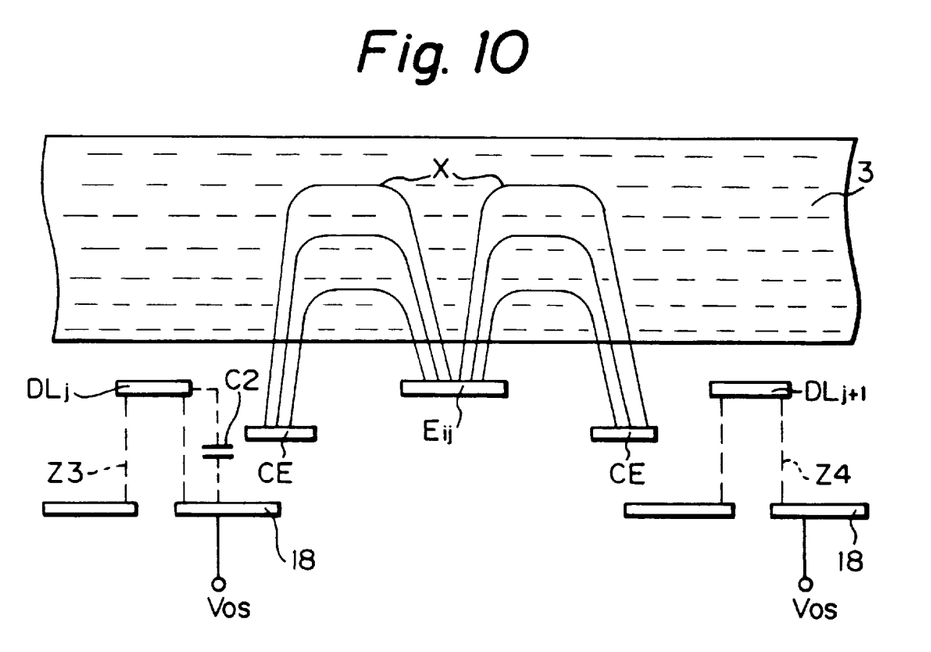
FIG. 10 is a cross-sectional view illustrating an enlargement of the liquid crystal layer of FIG. 9 for explaining the generation of lateral electric fields.

In FIG. 9 which is a cross-sectional view illustrating a second embodiment of the present invention, the optical shield layer 18 of FIG. 5 is modified to an optical shield layer 18' which covers only portions between the drain bus lines such as $DL_j$ and the common electrode CE. That is, an opening 18'a opposing a center portion of the drain bus line such as $DL_j$ is perforated in the optical shield layer 18'. In this case, although the optical shield effect of the optical shield layer 18' is a little deteriorated as compared with the optical shield layer 18 of FIG. 5, the overlapping area between the optical shield layer 18' and the drain bus line $DL_j$ can be reduced. As a result, a coupling capacitance C2 therebetween as shown in FIG. 10 is reduced as compared with the corresponding coupling capacitance C1 as shown in FIG. 7. This increases the propagation speed of signals on the data bus lines such as $DL_j$.

Figure 11:
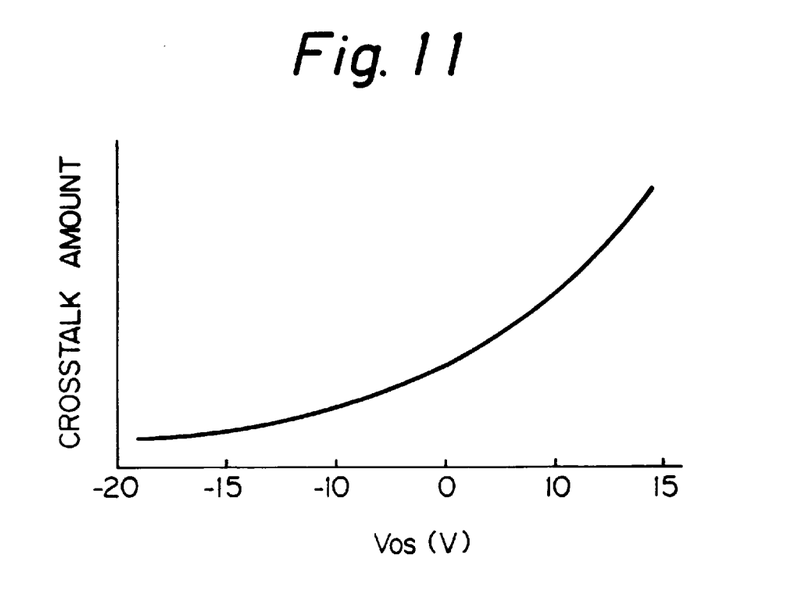
FIG. 11 is a graph showing the crosstalk characteristics of the apparatus of FIG. 9.

Further, as illustrated in FIG. 10, a DC voltage $V_{os}$ is applied to the optical shield layer 18' to create electric fields as indicated by Z3 and Z4 in FIG. 7. The electric fields Z3 and Z4 are also operated to lessen the electric fields Y1 and Y2 in FIG. 3, thus suppressing the crosstalk along a vertical direction. In this case, as shown in FIG. 11, when the DC voltage $V_{os}$ is smaller than −15V, the modulation effect can be reduced, so that the amount of crosstalk is remarkably reduced, thus enhancing the display quality.

As explained hereinabove, according to the present invention, since an optical shield layer is provided on the side of a glass substrate on the switching element side, the size of the optical shield layer can be reduced, thus increasing the numerical aperture. In addition, since the modulation of later electric fields by data bus lines is suppressed by application of a voltage to the optical shield, crosstalk can be suppressed, enhancing the display quality.

What is claimed is:

1. An in-plane liquid crystal display apparatus comprising a first transparent substrate having a plurality of gate bus lines, a plurality of drain bus lines, a plurality of pixel electrodes each connected via a switching element to one of said drain bus lines, and a common electrode on said first transparent substrate;

a second transparent substrate; and a liquid crystal layer interposed between said first and second transparent substrate, said apparatus further comprising an optical shield layer, formed on said first transparent substrate, for covering said drain bus lines;

wherein an opening is perforated in said optical shield layer, said opening opposing center portions of said drain bus lines.

2. An in-plane liquid crystal display apparatus comprising a first transparent substrate having a plurality of gate bus lines, a plurality of drain bus lines, a plurality of pixel electrodes each connected via a switching element to one of said drain bus lines, and a common electrode on said first transparent substrate;

a second transparent substrate; and a liquid crystal layer interposed between said first and second transparent substrate, said apparatus further comprising an optical shield layer, formed on said first transparent substrate, for covering said drain bus lines;

wherein said optical shield layer is conductive and a definite DC voltage is applied between said optical shield layer and said drain bus lines.

3. An in-plane liquid crystal display apparatus comprising a first transparent substrate having a plurality of gate bus lines, a plurality of drain bus lines, a plurality of pixel electrodes each connected via a switching element to one of said drain bus lines, and a common electrode on said first transparent substrate;

a second transparent substrate; and a liquid crystal layer interposed between said first and second transparent substrate, said apparatus further comprising an optical shield layer, formed on said first transparent substrate, for covering said drain bus lines;

a first conductive layer formed on a first surface of said first transparent substrate, said first conductive layer forming said optical shield layer;

a first insulating layer formed on said first conductive layer;

a second conductive layer formed on said first insulating layer, said second conductive layer forming said gate bus lines and said common electrode;

a second insulating layer formed on said second conductive layer;

a third conductive layer formed on said second insulating layer, said third conductive layer forming said drain bus lines and said pixel electrode;

a third insulating layer formed on said third conductive layer;

a first orientation layer coated on said third insulating layer;

a first polarization layer formed on a second surface of said first transparent substrate;

a fourth insulating layer formed on a first surface of said second transparent substrate;

a second orientation layer coated on said fourth insulating layer; and a second polarization layer formed on a second surface of said second transparent substrate.

4. The apparatus as set forth in claim 3, further comprising color filters formed between said second transparent substrate and said fourth insulating layer.

5. An in-plane liquid crystal display apparatus comprising:

a first transparent substrate having a plurality of gate bus lines, a plurality of drain bus lines, a plurality of pixel electrodes such connected via a switching element to one of said drain bus lines, and a common electrode on said first transparent substrate;

a second transparent substrate; and a liquid crystal layer interposed between said first and second transparent substrate, said apparatus further comprising a conductive optical shield layer, formed on said first transparent substrate, for covering the entirety of said drain bus line.

6. The apparatus as set forth in claim 5, wherein said conductive optical shield layer further covers portions between said drain bus line and said common electrode.

7. The apparatus as set forth in claim 5, wherein said conductive optical shield layer further covers said gate bus lines.

* * * * *

UNITED STATES PATENT AND TRADEMARK OFFICE
CERTIFICATE OF CORRECTION

PATENT NO.: 6,038,007
DATED: March 14, 2000
INVENTOR(S): Makoto WATANABE, Takahiko WATANABE It is certified that error(s) appears in the above-identified patent and that said Letters Patent is hereby corrected as shown below:

Column 2, line 47 delete "TET", insert --TFT--

Column 3, line 19 delete "TET" insert --TFT-- line 36 delete "GLi" insert --$GL_i$-- line 53 delete "$GL^{x2}$" insert --$GL_{x2}$-- line 65 delete "indicuted" insert --indicated--

Column 4, line 10 delete "apparatus," insert --apparatus--

Signed and Sealed this

Third Day of April, 2001

*Attest:*

NICHOLAS P. GODICI

*Attesting Officer*     *Acting Director of the United States Patent and Trademark Office*